May 22, 1945.  S. G. SAUNDERS ET AL  2,376,511
METHOD OF MAKING SYNTHETIC RESIN YARN
Filed May 23, 1941.
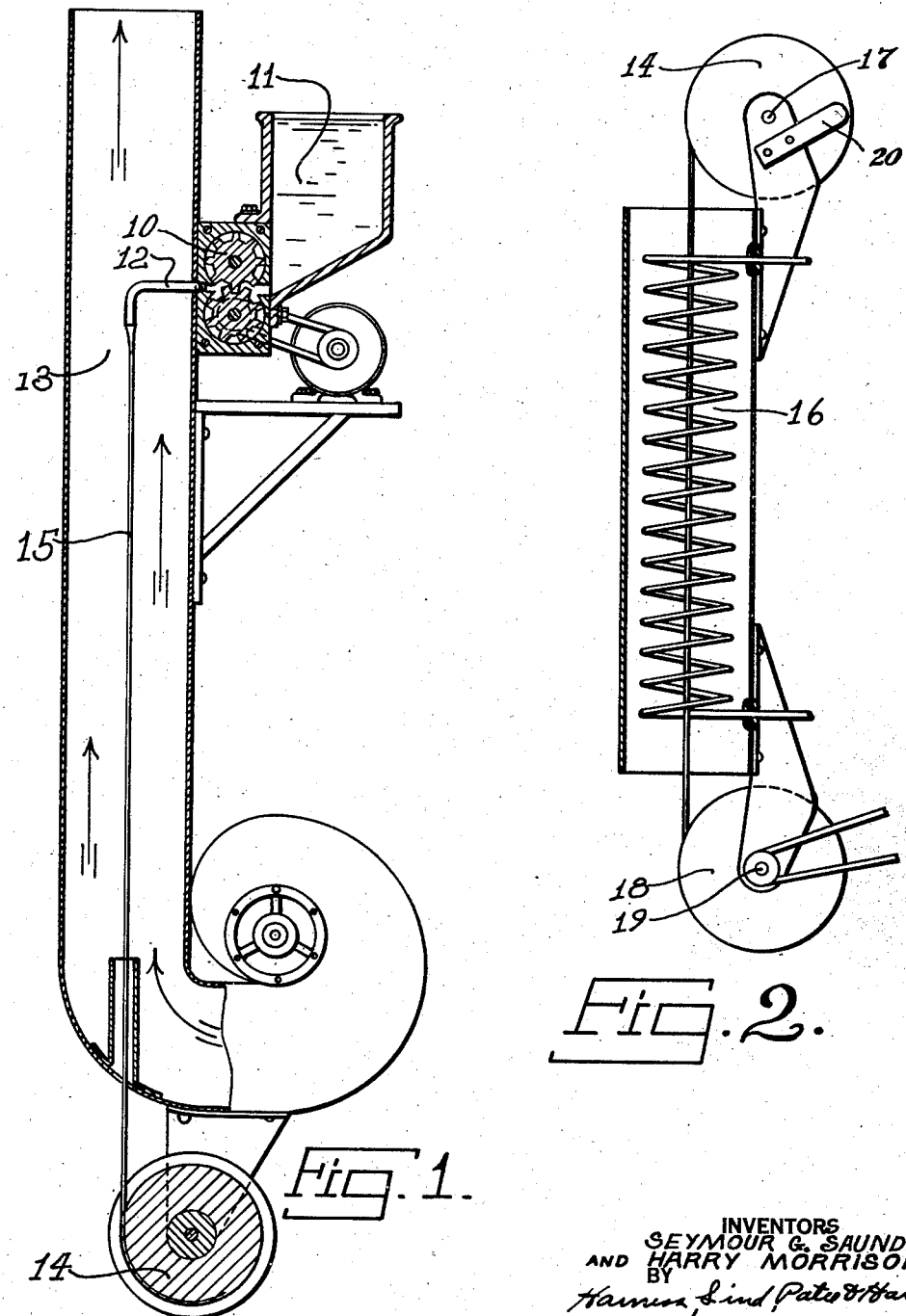
INVENTORS
SEYMOUR G. SAUNDERS
AND HARRY MORRISON.
BY
ATTORNEYS.

Patented May 22, 1945

2,376,511

UNITED STATES PATENT OFFICE 2,376,511

METHOD OF MAKING SYNTHETIC RESIN YARN

Seymour G. Saunders, Bloomfield Hills, and Harry Morrison, Detroit, Mich., assignors to Chrysler Corporation, Highland Park, Mich., a corporation of Delaware Application May 23, 1941, Serial No. 394,800

5 Claims. (Cl. 18—54)

This invention relates to an improved method of making synthetic resin yarn.

One of the main objects of the invention is the production of synthetic resin yarn which has many of the properties of synthetic thermoplastic resins but which has a materially higher softening point and resistancy to water than the latter.

Another object of the invention is the production of a synthetic resin yarn of which the softening temperature may be controlled and predetermined.

A further object of the invention is the production of a yarn of this character which has been strengthened by curing it under stress.

An illustrative embodiment of apparatus suitable for carrying out the invention is shown in the accompanying drawing, in which:

Fig. 1 is a fragmentary, diagrammatic sectional view of resin discharge and solvent vaporizing apparatus adapted to perform the initial steps of the improved synthetic yarn forming process.

Fig. 2 is a fragmentary, diagrammatic sectional view of apparatus for simultaneously curing and stressing the thread-like product formed by the apparatus illustrated in Fig. 1.

The composition from which the improved yarn is made preferably comprises substantially equal quantities of a synthetic thermosetting resin such as phenol formaldehyde resin or urea formaldehyde resin and a synthetic thermoplastic resin such as "Butacite" or modified polyvinyl acetate resin. "Butacite" is a trade named product manufactured by E. I. du Pont de Nemours & Company and comprises the reaction product of polyvinyl alcohol and butyraldehyde having the general formula.

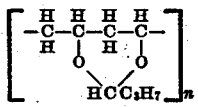

Modified polyvinyl acetate resin in solution in suitable solvents is available on the market under this nomenclature and is hydrolized polyvinyl acetate having a complex chain of molecules. The structure of the modified polymer may be pictured as a long chain, the alternate links of which are vinyl alcohol and vinyl acetate units:

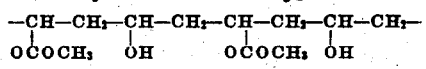

In general, the actual distribution of the alcohol and ester components in the chain depends on the chance hydrolysis of the ester group.

Other synthetic thermosetting resins which may be blended with the above thermoplastic resins are melamine resins. These resins are condensation products of dicyandiamide and formaldehyde. The curing operation may be conducted at lower temperatures when this resin is used in place of the foregoing thermo-setting resins.

Any selected combination of the foregoing synthetic thermosetting and thermoplastic resins is reduced by the addition of a suitable solvent to a consistency such that it is adapted to be discharged under pressure or extruded from an orifice of suitable size to produce a thread-like discharge. Solvents such as acetones, ketones, toluol, methyl acetate or butyl alcohol may be used alone or in combination mixtures. The viscosity of the resin blend may be varied throughout a wide range depending upon its composition, the size of the orifice through which it is discharged and the discharge pressure.

In Fig. 1 of the drawing is illustrated a gear pump 10 having an inlet 11 through which the resin blend is fed to its interior. The outlet of the gear pump comprises a discharge orifice 12 arranged to project the resin blend vertically downwardly in a fine stream of thread-like size through a passageway 13. A stream of heated air is caused to flow from a source (not shown) through the passageway 13 in a direction opposite to the discharge of the resin blend. The temperature of the air flowing through the passageway 13 is maintained sufficiently high to volatilize the solvent of the resin blend and to partially cure the latter to such an extent that it may be wound on a spool 14 located at the lower end of the passageway 13 which is driven by suitable driving mechanism (not shown) at a rate suitably proportioned with respect to the rate of discharge of resin from the pump 10 so as to avoid stressing or breaking of the resin stream.

After a desired length of yarn 15 is wound on the spool 14, the latter is transferred to the apparatus shown in Fig. 2 which includes a curing oven 16 having a heating element therein adapted to maintain the temperature of the oven at proper curing temperature for the resin blend under treatment.

The spool 14 is mounted on a dead spindle 17 located above the oven 16 and the yarn is fed through the latter and attached to a spool 18 which is mounted on a live or driven spindle 19 located below the oven 16. During rewinding of the yarn from the spool 14 to the spool 18, it is drawn through the oven 16, cured and simultaneously stressed to increase its strength by a stretching action. This stretching action may be produced in any suitable manner such as by applying a frictional drag on the upper spool 14 in Fig. 2, while the lower spool 18 is drivingly rotated. A slight friction drag of this character may be produced by mounting a resilient brush-like element 20 adjacent the spool 14 in Fig. 2 so that its free end portion frictionally engages the side of the latter spool. The temperature of the oven 16 may be varied throughout relatively wide limits, as much as from 165° F. to 325° F., depending upon the character of the resins used, the length of the curing treatment and the extent of final cure and nature of the characteristics of the final product desired.

While many details of the action which takes place between the synthetic thermosetting and synthetic thermoplastic resins is unknown, it is believed that an interlinkage takes place which results in a material raising of the softening point of the thermoplastic resin even though the thermosetting resin is present in only a minor proportion with respect to the thermoplastic resin. The above results as well as water resisting properties of the thermosetting resin are imparted to the final product without rendering it brittle and susceptible to fracture by flexure of the order to which yarn is normally subjected. The curing and simultaneous stressing of the yarn increases its tensile strength.

Although but several specific embodiments of our invention have been described, it is understood that various changes in the materials employed and in the sequence of steps as well as in the temperature and periods of heating, may be made without departing from the spirit of the invention.

We claim:

1. The method of making synthetic resin yarn which comprises the steps of dissolving in a volatile solvent a synthetic thermosetting resin selected from the group of synthetic resins consisting of phenol and urea formaldehyde resins and a synthetic thermoplastic resin selected from the group of resins consisting of the reaction product of polyvinyl alcohol and butyraldehyde and hydrolysis modified polyvinyl acetate resin, discharging said solution under pressure from an orifice in a thread-like discharge, conveying said discharge through a heated air stream to drive off the solvent thereof and precure it to a solid state, and simultaneously stressing and finally curing the resulting thread-like product by running it under stress between spools through a curing oven having a temperature within the setting range of said thermosetting resin.

2. The method of making synthetic resin yarn which comprises the steps of dissolving in a volatile solvent a synthetic thermosetting resin selected from the group of resins consisting of urea and phenol formaldehyde resins and a thermoplastic resin selected from the group of resins consisting of the reaction product of polyvinyl alcohol and butyraldehyde and hydrolysis modified polyvinyl acetate resin, discharging said solution under pressure from an orifice in a thread-like discharge, conveying said discharge through a heated air stream to drive off the solvent thereof, and curing the resulting thread-like product under stress by simultaneously stretching and heating it within the curing temperature range of the thermosetting resin content thereof.

3. The method of making synthetic resin yarn which comprises the steps of dissolving in a volatile solvent a mixture of phenol formaldehyde resin and hydrolysis modified polyvinyl acetate resin, discharging said solution under pressure from an orifice in a thread-like discharge, conveying said discharge through a heated air stream to drive off the solvent thereof, and curing the resulting thread-like product under stress by simultaneously stretching and heating it within the curing range of the phenol formaldehyde resin content thereof.

4. The method of making synthetic resin yarn which comprises the steps of dissolving in a volatile solvent a mixture of phenol formaldehyde resin and the reaction product of polyvinyl alcohol and butyraldehyde resin, discharging said solution under pressure from an orifice in a thread-like discharge, conveying said discharge through a heated air stream to drive off the solvent thereof, and curing the resulting thread-like product under stress by simultaneously stretching and heating it within the curing range of the phenol formaldehyde resin content thereof.

5. The method of making synthetic resin yarn which comprises the steps of dissolving in a volatile solvent a mixture of urea formaldehyde resin and hydrolysis modified polyvinyl acetate resin, discharging said solution under pressure from an orifice in a thread-like discharge, conveying said discharge through a heated air stream to drive off the solvent thereof, and curing the resulting thread-like product under stress by simultaneously stretching and heating it within the curing range of the urea formaldehyde resin content thereof.

SEYMOUR G. SAUNDERS.
HARRY MORRISON.